United States Patent
Ma et al.

(10) Patent No.: US 12,237,891 B2
(45) Date of Patent: Feb. 25, 2025

(54) USER EQUIPMENT CODEBOOK MEMORY

(71) Applicant: Apple Inc., Cupertino, CA (US)

(72) Inventors: Kexin Ma, San Diego, CA (US); Jennifer M. Edwards, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/878,799

(22) Filed: Aug. 1, 2022

(65) Prior Publication Data
US 2023/0080159 A1  Mar. 16, 2023

Related U.S. Application Data

(60) Provisional application No. 63/242,423, filed on Sep. 9, 2021.

(51) Int. Cl.
*H04B 7/0456* (2017.01)
(52) U.S. Cl.
CPC .................. *H04B 7/0456* (2013.01)
(58) Field of Classification Search
CPC ............ H04L 1/0057; H04L 25/03343; H04L 5/0023; H04L 1/0041; H04L 1/0045; H04L 2025/03426; H04L 5/0048; H04L 5/0053; H04B 7/0695; H04B 7/088; H04B 7/0617; H04B 7/0639; H04B 7/0456; H04B 7/063; H04B 7/0626; H04B 7/0634; H04W 72/046; H04W 24/10; H04W 16/28; H04W 72/23; H04W 72/542; H04W 24/08; H04W 56/001; H04W 88/02
USPC .......................................................... 375/267
See application file for complete search history.

(56) References Cited

U.S. PATENT DOCUMENTS

| 9,913,242 | B1* | 3/2018 | Saleh ..................... H04W 60/02 |
| 9,986,487 | B1* | 5/2018 | Oroskar ................. H04W 40/22 |
| 10,735,066 | B2 | 8/2020 | Mo et al. |
| 11,742,925 | B2* | 8/2023 | Va ......................... H04B 7/0456 |
| | | | 370/329 |
| 2013/0143583 | A1* | 6/2013 | Son ....................... H04W 72/54 |
| | | | 455/452.2 |
| 2019/0132828 | A1* | 5/2019 | Kundargi ............. H04B 17/318 |
| 2020/0106493 | A1 | 4/2020 | Bhamidipati et al. |
| 2021/0068123 | A1 | 3/2021 | Zhu et al. |

(Continued)

FOREIGN PATENT DOCUMENTS

WO    WO 2020168350    8/2020

OTHER PUBLICATIONS

[Unknown Author], "3rd Generation Partnership Project; Technical Specification Group Radio Access Network; NR; Radio Resource Control (RRC) protocol specification (Release 15)," 3GPP TS 38.331 V16.5.0, Jun. 2021, 959 pages.

(Continued)

*Primary Examiner* — Eva Y Puente
(74) *Attorney, Agent, or Firm* — Fish & Richardson P.C.

(57) ABSTRACT

Methods, systems, and apparatus, including computer programs encoded on computer storage media, for storing a codebook in an integrated circuit. One of the methods includes storing, for an integrated circuit that comprises a memory, first data for a codebook in the memory; determining second data for the codebook using the first data; and sending, over a bus, the second data for the codebook to an antenna module separate from the integrated circuit.

20 Claims, 3 Drawing Sheets

(56) References Cited

U.S. PATENT DOCUMENTS

2021/0226689 A1    7/2021   Farag et al.
2022/0385345 A1*   12/2022   Raghavan ............ H04B 7/0617

OTHER PUBLICATIONS

Extended European Search Report in European Appln. No. 22191886.5, dated Jan. 25, 2023, 9 pages.

* cited by examiner

USER EQUIPMENT CODEBOOK MEMORY

CROSS-REFERENCE TO RELATED APPLICATIONS

This application claims the benefit of U.S. Provisional Application No. 63/242,423, filed on Sep. 9, 2021, the contents of which are incorporated by reference herein.

BACKGROUND

Wireless communication networks provide integrated communication platforms and telecommunication services to wireless user devices. Example telecommunication services include telephony, data (e.g., voice, audio, and/or video data), messaging, internet-access, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include code division multiple access (CDMA) networks, time division multiple access (TDMA) networks, frequency-division multiple access (FDMA) networks, orthogonal frequency-division multiple access (OFDMA) networks, Long Term Evolution (LTE), and Fifth Generation New Radio (5G NR). The wireless communication networks facilitate mobile broadband service using technologies such as OFDM, multiple input multiple output (MIMO), advanced channel coding, massive MIMO, beamforming, and/or other features.

SUMMARY

User equipment, e.g., a mobile device such as a cellular phone or a tablet, can use a codebook, e.g., from a set of codebooks, to select a beam with which to transmit data with a base station, e.g., a cell tower. Once selected, the user equipment can transmit signals, e.g., data, with the base station. The data transmission can include receiving data, e.g., using a downlink; sending data, e.g., using an uplink; or both.

The user equipment can store data for a codebook in a set of codebooks in a memory included in an integrated circuit, other than an antenna module. The antenna module can include an antenna and a transceiver. The antenna module can include a control portion, e.g., included in either the antenna or the transceiver. When the antenna module needs to communicate, e.g., transmit or receive, data with a base station, the user equipment can access the memory to determine the data for the codebook. The user equipment can use the data for the codebook to determine a beam over which the user equipment can transmit the data to the base station. The user equipment, e.g., an integrated circuit included in the user equipment, can provide, to the antenna module included in the user equipment, an identifier for a beam over which the user equipment can transmit the data. This can cause the antenna module to use the identified beam for the transmission with the base station.

The data for the codebook can be any appropriate data. For instance, the data can include the codebook or a portion of the codebook, or an indication to the codebook or the portion of the codebook. The integrated circuit can store the codebook, or the set of codebooks in which the codebook is included, on the memory in the integrated circuit other than the transceiver to reduce a complexity of the antenna module, when the antenna module does not have sufficient memory to store the codebook, or both.

In some examples, the data for the codebook can include input data and data for a process by which the user equipment can dynamically generate at least a portion of the codebook. For instance, the input data can be electric field ("e-field") data for the user equipment. This input data can be specific to the device's, e.g., user equipment's, properties. The use of e-field data for the user equipment can enable the user equipment to dynamically generate a codebook or a portion of the codebook for the user equipment, which can improve the performance of the user equipment compared to other devices that do not dynamically generate a codebook or a portion of a codebook. The user equipment can use the e-field data as input to the process by which the user equipment will determine the identifier for the beam.

In general, one aspect of the subject matter described in this specification can be embodied in methods that include the actions of storing first data for a set of codebooks for a user equipment in a memory included in an integrated circuit; determining second data for the set of codebooks for the user equipment using the first data; and sending, over a bus, the second data for the set of codebooks for the user equipment to an antenna module separate from the integrated circuit.

Other embodiments of this aspect include corresponding computer systems, apparatus, devices, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The actions can be performed by an integrated circuit. The integrated circuit can include the memory. The integrated circuit can include a non-transitory computer storage medium encoded with instructions that, when executed by the integrated circuit, cause the integrated circuit to perform the actions. The integrated circuit can be a baseband processor. The integrated circuit can be an intermediate frequency integrated circuit. The memory can include the non-transitory computer storage medium. The memory can be a separate component from the non-transitory computer storage medium.

In some implementations, the method can include storing, in the memory and as the first data, at least a portion of the set of codebooks. The method can include storing, in the memory and as the first data, electronic field data for a user equipment. Determining the second data can include generating, using electronic field data for a user equipment, a phase shifter and a gain as the second data. The method can include receiving, from the antenna module, a reception beam measurement. Determining the second data can include generating, using the electronic field data and the reception beam measurement, a beam codebook entry as the second data. The beam codebook entry can indicate a phase shifter, a gain, or both, for the antenna module. Sending the second data can cause the antenna module to use the phase shifter, the gain, or both, to communicate with a base station.

In some implementations, a device can include the bus. The system can include the antenna module. The device can be a user equipment that includes the integrated circuit, the bus, and the antenna module. The device can include a second bus that connects the integrated circuit and the antenna module. The method can include transmitting, over the second bus, at least one of a reception beam measurement, an automatic gain control, or an antenna module setting update. Transmitting the reception beam measurement can include receiving, over the second bus and from the antenna module, the reception beam measurement. Transmitting the antenna module setting update can include providing, over the second bus and to the antenna module, the antenna module setting update. The second bus can include a separate hardware bus from the bus. The bus can be a software bus implemented on the second bus. The method can include blanking, on the second bus, traffic to create a gap during which the integrated circuit can send the second data on the second bus.

In some implementations, the method can include, after sending the second data over the bus, receiving, from the antenna module, a reception beam measurement; and determining, using the reception beam measurement and the first data for the codebook, updated second data for the set of codebooks; and sending, over the bus, the updated second data for the set of codebooks to the antenna module to cause the antenna module to use the updated second data for transmissions with a base station.

The subject matter described in this specification can be implemented in various embodiments and may result in one or more of the following advantages. In some implementations, the methods and systems described in this specification can store an e-field model or only a portion of the codebook in a user equipment's, e.g., integrated circuit's, memory to reduce the size of the data required for the user equipment to use the codebook. In some implementations, the systems and methods described in this specification can store the data for the codebook in an integrated circuit, separate from an antenna module, to allow for more data storage for the codebook, e.g., when the antenna module has insufficient memory, a more efficient antenna module, or both, compared to systems that store the codebook in the antenna module. For example, an integrated circuit can store a codebook in memory that would be too large to store in an antenna module's memory. This can occur when a size of a codebook, or a set of codebooks for a user equipment that includes the codebook, grows over time as the antenna module is configured for communications on a wider range of frequencies than previously required, e.g., 5G communications, and the codebook or the set of codebooks has additional entries for the wider range of frequencies such that the codebook is too large to store in the antenna module's memory.

In some implementations, when the systems or methods described in this specification store i) only a portion of the codebook, ii) the e-field model, or iii) both, they can dynamically determine at least some codebook values. This can enable the systems or methods to determine values specific to a user equipment's properties which can optimize the user equipment's communications with base stations. These communications with base stations can be more efficient than systems that don't determine any codebook values dynamically. For instance, a user equipment that dynamically determines at least some codebook values using the user equipment's e-field can have improved coverage, improved throughput, or both, compared to other systems.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

As user equipment uses a wider range of frequencies, such as millimeter wave frequencies, for communication with a base station, e.g., as part of 5G communications, the size of a codebook, or a set of codebooks, used to determine the beam for the communications continues to grow. For instance, the set of codebooks can include a codebook for each beam, and increased frequency ranges increase the number of codebooks included in the set. The increasing codebook size can be constrained by memory limitations of an antenna module in the user equipment that stores the codebook. Further, a codebook is generated based on a particular device, e.g., a particular user equipment device, and then distributed to multiple devices even though the multiple devices do not necessarily have the same properties, e.g., electronic field ("e-field"), as the particular device for which the codebook is optimized. This can result in the codebook not being optimized for at least some of the multiple devices, and suboptimal communications with base stations for those devices.

To provide for the increasing codebook size, user equipment can store data for a codebook or a set of codebooks in an integrated circuit, such as a baseband integrated circuit or an intermediate frequency integrated circuit. The data for the set of codebooks can be the codebook, the set of codebooks, a portion of the set of codebooks, e.g., for wider beams, an e-field model for the user equipment, or a combination of these, e.g., a portion of a set of codebooks and an e-field model. Storing only a portion of the set of codebooks, an e-field model, or both, can reduce the size of the data for the set of codebooks or the codebook stored on the user equipment. Storing the data for the set of codebooks in an integrated circuit, separate from the antenna module, can allow for more data storage compared to systems that store the codebook in the antenna module, e.g., that has a limited size memory that is less than the size of the set of codebooks.

When the user equipment stores only a portion of the set of codebooks, the e-field model, or both, the user equipment can dynamically determine at least some codebook values. This can enable the user equipment to determine values specific to the user equipment's properties which can optimize the user equipment's communications with base stations. For instance, a user equipment that dynamically determines at least some codebook values using the user equipment's e-field can have improved coverage, improved throughput, or both, compared to other systems.

Figure 1:
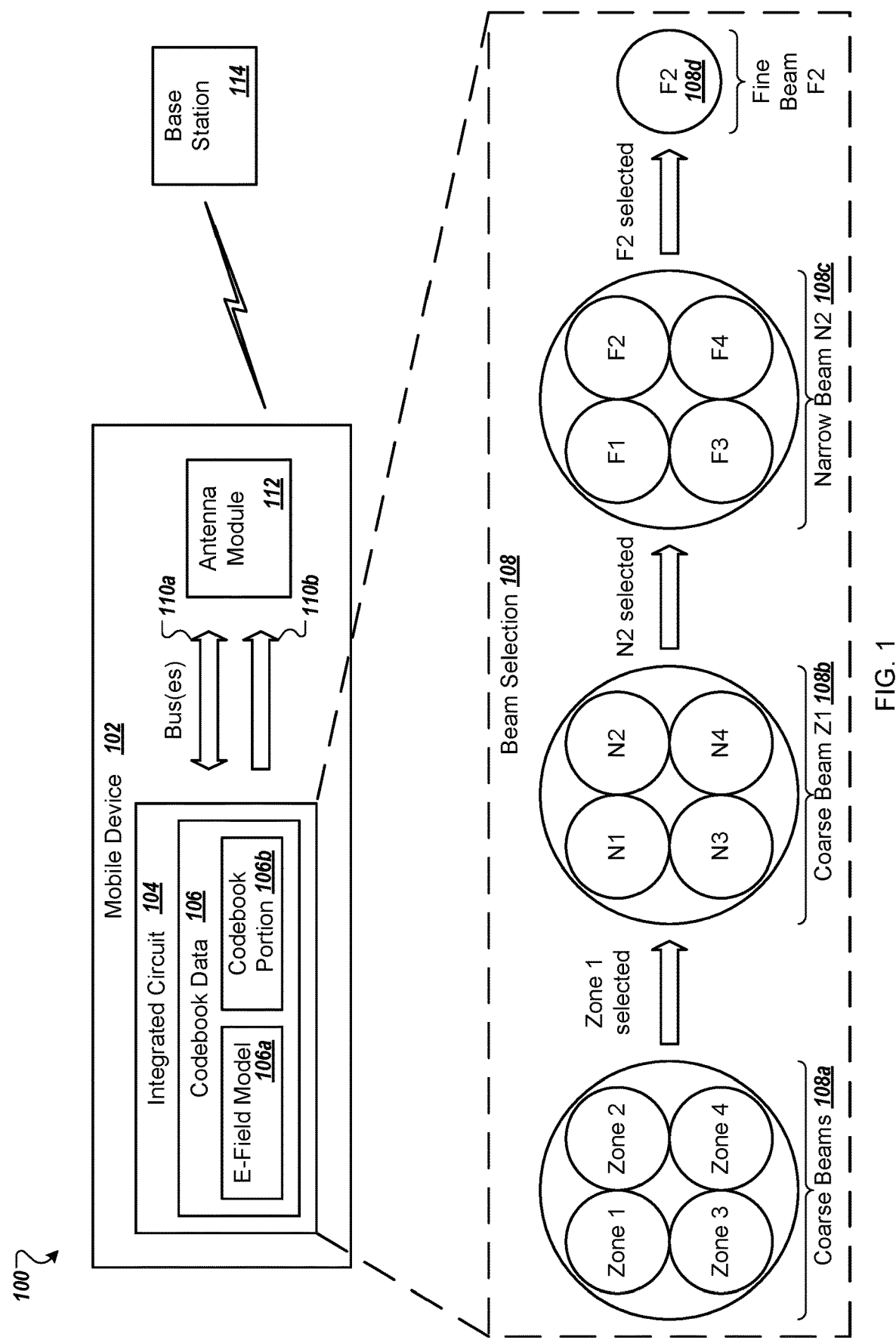
FIG. 1 depicts an example environment of a mobile device with an integrated circuit that stores codebook data.

FIG. 1 depicts an example environment 100 of a mobile device 102 with an integrated circuit 104 that stores codebook data 106. The mobile device 102 is an example of a user equipment, such as a smart phone, a smart watch, a tablet, or another type of device that can transmit data with a base station. Some examples of the integrated circuit 104 include a baseband integrated circuit or an intermediate frequency integrated circuit.

The integrated circuit 104 includes one or more memories. The integrated circuit 104 can use the one or more memories to store the codebook data 106. For instance, as the codebook data 106, the integrated circuit 104 can store an e-field model 106a in the one or more memories. The integrated circuit 104 can use the e-field model to dynamically generate one or more values for the codebook or a set of codebooks as part of a beam selection process 108.

For the beam selection process 108, the integrated circuit 104 can construct a codebook, a portion of a codebook, or a portion of a set of codebooks in real-time. For example, the integrated circuit 104 can construct a codebook entry in real-time. The integrated circuit 104 can construct the codebook or the set of codebooks using real-time beam measurements received via a first bus 110a that connects the integrated circuit 104 with an antenna module 112.

For instance, the integrated circuit 104 can use the first bus 110a to transmit, e.g., send and receive, data with the antenna module 112. As part of this data transmission, the integrated circuit 104 can receive, via the first bus 110a, reception beam measurements captured by the antenna module 112. The integrated circuit can send, to the antenna module 112 and via the first bus 110a, an antenna integrated circuit setting update. In some examples, the integrated circuit can send, to the antenna module 112 and via the first bus 110a, a transmission automatic gain control, a reception automatic gain control, or both.

When the integrated circuit 104 receives the reception beam measurement via the first bus 110a from the antenna module 112, the integrated circuit 104 can perform a beam selection process 108. The integrated circuit 104 can perform the beam selection process 108 every time the integrated circuit 104 receives a reception beam measurement or for a subset of received reception beam measurements, e.g., when the reception beam measurement satisfies a beam measurement threshold.

For example, the antenna module 112 can use multiple coarse beams 108a for transmissions with a base station 114. Each of the multiple coarse beams 108a can be for a separate zone, Z1, Z2, Z3, and Z4. Although FIG. 1 depicts four zones, the antenna module 112 can include more or fewer than four zones for the multiple coarse beams 108a.

Because each of the beams, e.g., the multiple coarse beams 108a, is directional, the performance of data transmissions over the beams can vary by beam. This performance variance can be caused by any of multiple different factors, such as a direction the mobile device 102 is facing, where the mobile device is located within a cell for the base station 114, or whether and where a user is holding the mobile device 102, among other factors.

To optimize transmissions with the base station 114, the antenna module 112 captures a reception beam measurement for a coarse beam 108a. In some examples, the antenna module 112 captures reception beam measurements for each of the multiple coarse beams 108a, or a reception beam measurement for two or more of the coarse beams 108a. The antenna module 112 sends, via the first bus 110a, the reception beam measurement or measurements to the integrated circuit 104.

The integrated circuit 104 receives the reception beam measurement or measurements from the antenna module 112 via the first bus 110a. The integrated circuit 104 can use the beam measurements, along with the codebook data 106, to select a coarse beam zone from the multiple coarse beams 108a. The selected coarse beam zone has or is likely to have a better performance than the other coarse beam zones 108a for transmissions with the base station 114. For instance, the integrated circuit 104 can determine that a coarse beam Z1 108b has or will likely have the best performance out of the multiple coarse beams 108a.

When the integrated circuit 104 has the e-field model 106a, for the mobile device 102, as the codebook data 106, the integrated circuit 104 can generate a portion of a codebook or a set of codebooks to select the coarse beam zone. For example, the integrated circuit can use the e-field model 106a, the reception beam measurements for the multiple coarse beams 108a, or both, as input into a process that outputs the selected coarse beam zone, e.g., the coarse beam Z1 108b. The output for the selected coarse beam zone can be a codebook entry for the selected coarse beam zone.

The integrated circuit 104 can send data, e.g., a codebook entry, for the coarse beam Z1 108b to the antenna module 112. For instance, the integrated circuit 104 can send, over a second bus 110b, codebook data that identifies the coarse beam Z1 108b. The codebook data can include a phase shifter setting, a gain setting, or both, as the codebook data that identifies the coarse beam Z1 108b.

The antenna module 112 can use the received codebook data for additional transmissions with the base station 114. For instance, the antenna module 112 can use the coarse beam Z1 108b to transmit data with the base station 114. The coarse beam Z1 108b can have multiple narrow beams N1, N2, N3, and N4. The antenna module 112 can capture one or more reception beam measurements for the coarse beam Z1 108b. For instance, the antenna module 112 can capture a reception narrow beam measurement for the coarse beam Z1 108b, at least some of the multiple narrow beams N1, N2, N3, or N4, or both. The antenna module 112 sends, via the first bus 110a, the reception narrow beam measurement to the integrated circuit 104.

The integrated circuit 104 receives the reception narrow beam measurement from the antenna module 112 over the first bus 110a. The integrated circuit 104 selects, from the multiple narrow beams N1, N2, N3, and N4 for the coarse beam Z1 108b, a narrow beam that has or will likely have a better performance than the other narrow beams for communications with the base station 114. For instance, the integrated circuit 104 can use a process that uses, as input, the e-field model 106a and the reception narrow beam measurement. The integrated circuit can generate, as output from the process, data that identifies the narrow beam that has or will likely have the better performance than the other narrow beams. For instance, the integrated circuit 104 can select a narrow beam N2 108c.

The integrated circuit 104 can send data for the selected narrow beam N2 108c to the antenna module 112. For instance, the integrated circuit 104 can send, over the second bus 110b, codebook data that identifies the narrow beam N2 108c. The codebook data can include a phase shifter setting, a gain setting, or both, as the codebook data that identifies the narrow beam N2 108c. In some examples, the codebook data can be a codebook for the narrow beam N2, e.g., when the antenna module 112 stores a codebook for the coarse beam Z1 in memory.

For example, the set of codebooks can include a codebook for each beam. As the integrated circuit 104 determines a beam for a first wavelength, e.g., the coarse beam Z1 108b, the integrated circuit 104 can determine a subset of codebooks for the coarse beam Z1 108*b*. Each codebook in the subset can be for a corresponding narrow beam N1-4.

The antenna module 112 can use the received codebook data for the narrow beam for additional transmissions with the base station 114. For instance, the antenna module 112 can use the narrow beam N2 108*c* to transmit data with the base station 114. The narrow beam N2 108*c* can have multiple fine beams F1, F2, F3, and F4. The antenna module 112 can capture one or more reception beam measurements for the narrow beam N2 108*c*. For instance, the antenna module 112 can capture a reception fine beam measurement for the narrow beam N2 108*c*, at least some of the multiple fine beams F1, F2, F3, or F4, or both. The antenna module 112 sends, via the first bus 110*a*, the reception fine beam measurement to the integrated circuit 104.

The integrated circuit 104 receives the reception fine beam measurement from the antenna module 112 over the first bus 110*a*. The integrated circuit 104 selects, from the multiple fine beams F1, F2, F3, and F4 for the narrow beam N2 108*c*, a fine beam that has or will likely have a better performance than the other fine beams for communications with the base station 114. For instance, the integrated circuit 104 can use a process that uses, as input, the e-field model 106*a* and the reception fine beam measurement. The integrated circuit can generate, as output from the process, data that identifies the fine beam that has or will likely have the better performance than the other fine beams. For instance, the integrated circuit 104 can select a fine beam F2 108*d* as having or likely having the best performance for transmissions with the base station 114.

The integrated circuit 104 can send data for the selected fine beam F2 108*d* to the antenna module 112. For instance, the integrated circuit 104 can send, over the second bus 110*b*, codebook data that identifies the fine beam F2 108*d*. The codebook data can include a phase shifter setting, a gain setting, or both, as the codebook data that identifies the fine beam F2 108*d*.

The antenna module 112 can then use the codebook data for the fine beam F2 108*d* to transmit data with the base station 114. For instance, the antenna module 112 can use the fine beam F2 108*d* to receive downlink data from, send uplink to, or both, the base station 114. The downlink data, uplink data, or both, can include data for a telephone network data, Internet network data, or both.

Although this process is described with reference to three beam selections, coarse, narrow, and fine, the mobile device 102 can use this process for more or fewer beam selections. For instance, the mobile device 102 can use the process for more beam selections when beams become smaller, e.g., smaller than millimeter wave.

As indicated above, the integrated circuit 104 uses the first bus 110*a* to send data to and receive data from the antenna module 112. The first bus 110*a* is a hardware bus that connects the integrated circuit 104 and the antenna module 112.

The integrated circuit 104 can use the second bus 110*b* only to send codebook data to the antenna module 112. For instance, the second bus 110*b* can be a hardware bus that connects the integrated circuit 104 and the antenna module 112. In some examples, the second bus 110*b* is a one-way hardware bus.

The second bus 110*b* can be a software bus implemented on the first bus 110*a*. For instance, the mobile device 102 can include a single first bus 110*a* that connects the integrated circuit 104 and the antenna module 112 in hardware. To send data across the second bus 110*b* implemented in software, the integrated circuit 104 can blank the first bus's 110*a* traffic to create a gap in the traffic. The integrated circuit 104 can send codebook data to the antenna module 112 during the gap in the traffic on the first bus 110*a*, which gap provides a software implementation for the second bus 110*b*.

A codebook can include a number of active antenna feeds for the antenna module 112, e.g., up to a maximum of five; a phase shifter setting for each antenna feed, e.g., 32 setting per feed; a gain setting for each antenna feed, e.g., around 32 to 64 settings; or a combination of these. As the number of frequency bands for which the set of codebooks includes data increases, the size of the set of codebooks, and at least some of the codebooks in the set, increases.

To accommodate the larger memory requirements for a larger codebook, a larger set of codebooks, or both, the mobile device 102 can store codebook data in the integrated circuit's 104 memory which is larger than the antenna module's 112 memory.

As mentioned above, in some implementations, the codebook data 106 can include at least a portion 106*b* of the codebook, or set of codebooks, itself. The integrated circuit 104 can store a portion 106*b* of the codebook in the codebook data 106 when the integrated circuit's 104 memory has insufficient capacity to store the entire codebook or set of codebooks. For instance, the codebook data 106 can include codebook data 106 for coarse beams, narrow beams, or both, e.g., but not fine beams.

In some implementations, the codebook data 106 can include a codebook portion 106*b* and does not include the entire codebook or the entire set of codebooks. In these implementations, the codebook data 106 can include the e-field model 106*a*. When making a beam selection, the integrated circuit 104 can determine whether the codebook portion 106*b* has data for the beam selection or to use the e-field model 106*a* for the beam selection.

For instance, the integrated circuit 104 can determine the type of beam selection being made, e.g., coarse, narrow or fine. The integrated circuit 104 can use the type of beam selection to determine whether data for the corresponding type is included in the codebook portion 106*b* stored in memory. When the integrated circuit 104 determines that data for the corresponding type selection is stored in memory, the integrated circuit 104 can retrieve codebook data from the memory, e.g., selecting the data using the reception beam measurement. When the integrated circuit 104 determines that data for the corresponding type selection is not stored in memory, the integrated circuit 104 can dynamically generate the codebook data, e.g., using the reception beam measurement, the e-field model 106*a*, or both.

In some implementations, the integrated circuit 104 can cache generated codebook data in memory. For instance, the integrated circuit 104 might initially not have any codebook entries, e.g., the codebook portion 106*b*, stored in memory. In these examples, the integrated circuit 104 maintains the e-field model 106*a* in the memory. As the integrated circuit 104 generates codebook entries using the e-field model 106*a*, the integrated circuit 104 can store the codebook entries in memory, e.g., as part of the codebook portion 106*b*.

The integrated circuit 104 can determine whether to cache a codebook entry in memory. For instance, the integrated circuit 104 can use a beam type, e.g., coarse or narrow or fine, for the codebook entry to determine whether to cache the codebook entry in memory. When the beam type for the codebook entry matches one of one or more predetermined types, e.g., coarse or narrow, the integrated circuit 104 can determine to cache the codebook entry in memory. When the beam type for the codebook entry does not match any of the one or more predetermined types, e.g., the beam type is fine, the integrated circuit 104 can determine to skip caching the codebook entry in memory.

In some implementations, the integrated circuit 104 can make the caching determination using a size of the memory included in the integrated circuit 104. For instance, a set of codebooks can include a first codebook with a smaller number of entries for wider beam types, e.g., coarse and narrow, and a second codebook with a larger number of entries for finer beam types, e.g., fine. The integrated circuit 104 can use the number of entries for the various beam types to determine for which beam types the memory has sufficient capacity to store codebook entries for that beam type.

In some implementations, the antenna module 112 can preload one or more codebook entries into the antenna module's 112 memory. For instance, the antenna module 112 can preload one or more wideband beam codebook entries in its memory. This can include the antenna module 112 storing coarse beam codebook entries, narrow beam codebook entries, or both, in the antenna module's 112 memory. In some examples, the antenna module 112 stores all codebook entries for a corresponding beam type in its memory, e.g., coarse, narrow, or both. The codebook entries can be for a mobile device 102 specific codebook or set of codebooks, e.g., generated using the e-field model 106a. The codebook entries can be for a particular mobile device codebook or set of codebooks, e.g., that is used by multiple different mobile devices.

In these implementations, the antenna module 112 can perform one or more steps of the beam selection process 108. For instance, the antenna module 112 can use a first reception beam measurement to select a coarse beam zone, a second reception beam measurement to select a narrow beam, or both.

Table 1, below, shows an example of an antenna module 112 codebook storage design. As shown in Table 1, the antenna module 112 can receive, from the integrated circuit 104 or another component of the mobile device 102, the coarse beam and narrow beam codebook entries. The antenna module 112 can store these received coarse and narrow beam codebook entries in the antenna module's 112 memory.

As the antenna module 112 using the codebook storage design of Table 1 requires fine beam codebook entries, the antenna module 112 can send reception beam measurements to the integrated circuit 104. These reception beam measurements can act as requests for fine beam codebook entry requests. In some examples, the antenna module 112 can send the integrated circuit 104 a fine beam codebook entry request that includes data other than a reception beam measurement.

The integrated circuit 104 can compute a fine beam codebook entry in response to receipt of the reception beam measurement, the fine beam codebook entry request, or both. For instance, as discussed above, the integrated circuit 104 can compute a fine beam codebook entry using the e-field model 106a, the selected narrow beam, e.g., the narrow beam N2 108c, or both. This can include computing the fine beam codebook entry using the reception beam measurement for the selected narrow beam.

TABLE 1

Example Codebook Storage Design

| Beam ID | Phase Shifter | Gain | Beam Relation | Loading Algorithm |
|---|---|---|---|---|
| 1 | PS1 | G1 | Coarse Beam (Z1) | Characterized Static |
| 2 | PS2 | G2 | Coarse Beam (Z2) | Characterized Static |
| 3 | PS3 | G3 | Narrow Beam (N1) | Characterized Static |
| 4 | PS4 | G4 | Narrow Beam (N2) | Characterized Static |
| 5 | PS5 | G5 | Fine Beam (F1) | Computed Dynamically |
| 6 | PS6 | G6 | Fine Beam (F2) | Computed Dynamically |

The antenna module 112 can connect to multiple antennas. The multiple antennas can include multiple antenna arrays, each of which include two or more antennas. Some of the antennas can face different directions with respect to the mobile device 102. Some of the antennas can be in different locations on the mobile device 102. The antenna module 112 can use the codebook data to select an antenna, properties for an antenna, or both, with which to transmit data with the base station 114.

Figure 2:
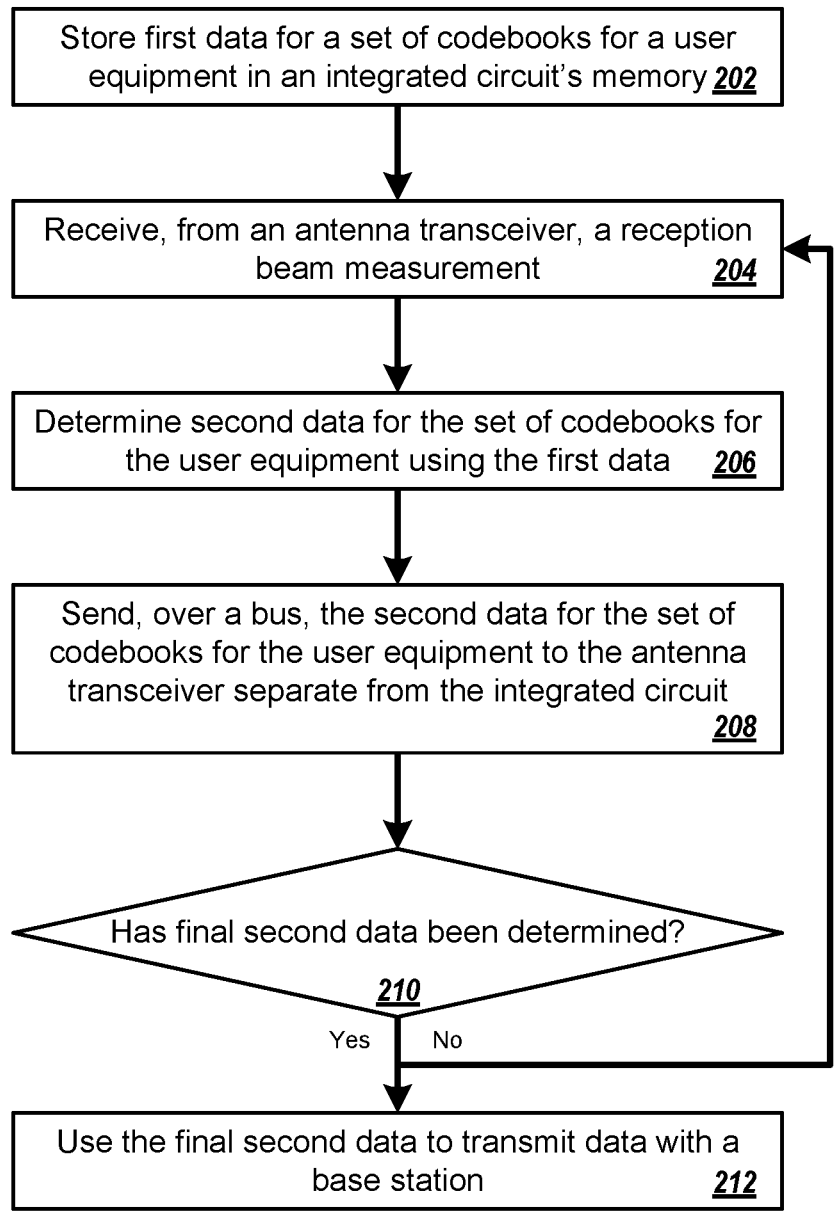
FIG. 2 is a flow diagram of an example process for providing codebook data to an antenna module.

FIG. 2 is a flow diagram of an example process 200 for providing codebook data to an antenna module. For example, the process 200 can be used by the mobile device 102, e.g., by a combination of the integrated circuit 104 and the antenna module 112, from the environment 100.

A mobile device, e.g., an integrated circuit, stores first data for a set of codebooks for a user equipment in the integrated circuit's memory (202). The first data can include electronic field data that the integrated circuit uses to generate entries for the set of codebooks. The first data can include at least a portion of a codebook, e.g., some but not all entries for the codebook, from the set of codebooks. The first data can include an entire codebook from the set of codebooks. The first data can include all data for the entire set of codebooks.

The mobile device can be a user equipment. For instance, the mobile device can be a smart phone, another type of cellular phone, a tablet, an e-book, a laptop, or another appropriate type of mobile device that includes an antenna module, e.g., a cellular antenna module.

In some examples, a device other than a mobile device can perform the steps in the process 200. For instance, a non-mobile device that includes the integrated circuit and the antenna module can perform one or more steps for the process 200.

The mobile device, e.g., the integrated circuit, receives, from an antenna module, a reception beam measurement (204). For instance, the mobile device receives the reception beam measurement over a first bus. The first bus can be bi-directional and connect the integrated circuit to the antenna module.

The mobile device, e.g., the integrated circuit, determines second data for the set of codebooks for the user equipment using the first data (206). The second data can be phase shifter, a gain, or both, e.g., for an entry in a codebook from the set of codebooks. The mobile device can determine the second data by accessing a codebook from the set of codebooks when the codebook is stored in the memory. The mobile device can generate the second data using the reception beam measurement, electronic field data for the mobile device, or both, e.g., when the codebook from the set of codebooks is not stored in the memory. The mobile device can generate the second data using the electronic field data when codebook data for the reception beam measurement is not stored in the integrated circuit's memory, a memory of the antenna module, or both.

The mobile device, e.g., the integrated circuit, sends, over a bus, the second data for the set of codebooks for the user equipment to the antenna module separate from the integrated circuit (208). For instance, the integrated circuit can send the second data via a second bus to the antenna module. The second bus can be a separate bus from the first bus, e.g., when both buses are hardware buses. The second bus can be the same bus as the first bus, e.g., when the second bus is implemented using software on the first bus, the latter of which is a hardware bus.

The mobile device, e.g., the integrated circuit, determines whether final second data been determined (210). The final second data can be for transmissions with a particular base station. For instance, the final second data can be data used for transmissions on a smallest wavelength, e.g., fine beam or millimeter wave.

When the mobile device connects to a different base station, or one or more properties of the mobile device change with respect to the base station, the mobile device can repeat one or more steps in the process 200 again, e.g., steps 204 through 208. The properties of the mobile device that might change can include a direction the mobile device is facing, a location within the base station's cell at which the mobile device is located, movement of another object within the cell, e.g., between the base station and the mobile device, or a combination of two or more of these, to name a few examples.

For instance, the integrated circuit can determine whether the second data was for a fine beam codebook entry, e.g., for a codebook in the set of codebooks. If not, the integrated circuit can proceed to step 204 and repeat one or more steps in the process 200 for another reception beam measurement. If so, the integrated circuit can proceed to step 212. In some examples, the integrated circuit determines whether the final second data has been determined based at least in part on whether the integrated circuit receives another reception beam measurement from the antenna module.

In some implementations, the integrated circuit can determine whether the final second data has been determined using a measurement threshold. For example, after sending the second data to the antenna module, the integrated circuit can receive a reception beam measurement for the second data from the antenna module. The integrated circuit can determine whether the reception beam measurement satisfies the measurement threshold, e.g., is greater than, equal to, or either, the measurement threshold. When the integrated circuit determines that the reception beam measurement satisfies the measurement threshold, the integrated circuit can determine that the final second data has been determined. When the integrated circuit determines that the reception beam measurement does not satisfy the measurement threshold, the integrated circuit can determine that the final second data has not been determined. The reception beam measurement might not satisfy the measurement threshold when the reception beam measurement is less than, equal to, or either, the measurement threshold.

The determination whether the reception beam measurement satisfies the measurement threshold can be any appropriate type of determination. For instance, the mobile device can determine whether the reception beam measurement satisfies signal to noise ratio ("SNR"), e.g., a predetermined SNR. The mobile device can determine whether the reception beam measurement satisfies a reference signal received power ("RSRP"), e.g., a predetermined RSRP. In some examples, the mobile device can determine whether the reception beam measurement satisfies both a SNR and a RSRP.

In some implementations, the measurement threshold can be an upper bound for a beam the mobile device can generate. For instance, for a given e-field model and millimeter wave antenna array design, the mobile device can have an, e.g., absolute, upper bound of the finest beam the mobile device can generate. The mobile device can use the upper bound of the finest beam that the mobile device can generate as the measurement threshold. When the mobile device determines that it cannot generate a finer beam than a current beam, the mobile device can determine that the final second data has been determined.

The mobile device can use a combination of two or more measurement thresholds. For instance, the mobile device can determine that an SNR, a RSRP, or both, are not satisfied and that the mobile device used the finest beam for the most recent beam measurement. In response, the mobile device can determine that final second data has been determined.

The mobile device, e.g., the antenna module, uses the final second data to transmit data with a base station (212). For instance, the antenna module configures one or more antennas using the final second data. The antenna module uses the configured one or more antennas to transmit data with, e.g., receive data from, transmit data to, or both, the base station.

The order of steps in the process 200 described above is illustrative only, and providing the codebook data to the antenna module can be performed in different orders. For example, the mobile device can determine whether the final second data has been determined, e.g., perform step 210, after receiving the reception beam measurement, e.g., performing step 204.

In some implementations, the process 200 can include additional steps, fewer steps, or some of the steps can be divided into multiple steps. For example, the mobile device can perform steps 204, 206, and 208 without performing the other steps in the process 200. In some examples, the mobile device, e.g., the integrated circuit, can maintain the first data in the memory, e.g., instead of or in addition to storing the first data in the memory. In some implementations, the mobile device can perform steps 204, 206, 208, and 212 without performing the other steps in the process 200. In some implementations, the mobile device can perform steps 202 through 208 without performing the other steps in the process 200. In some implementations, the mobile device can perform steps 204 through 210 without performing the other steps in the process 200. In some examples, the mobile device can stop refining, generating, or both, new beams until the measurement threshold is satisfied. In some examples, the mobile device can refine, generate, or both, new beams until a narrowest beam is hit.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

Figure 3:
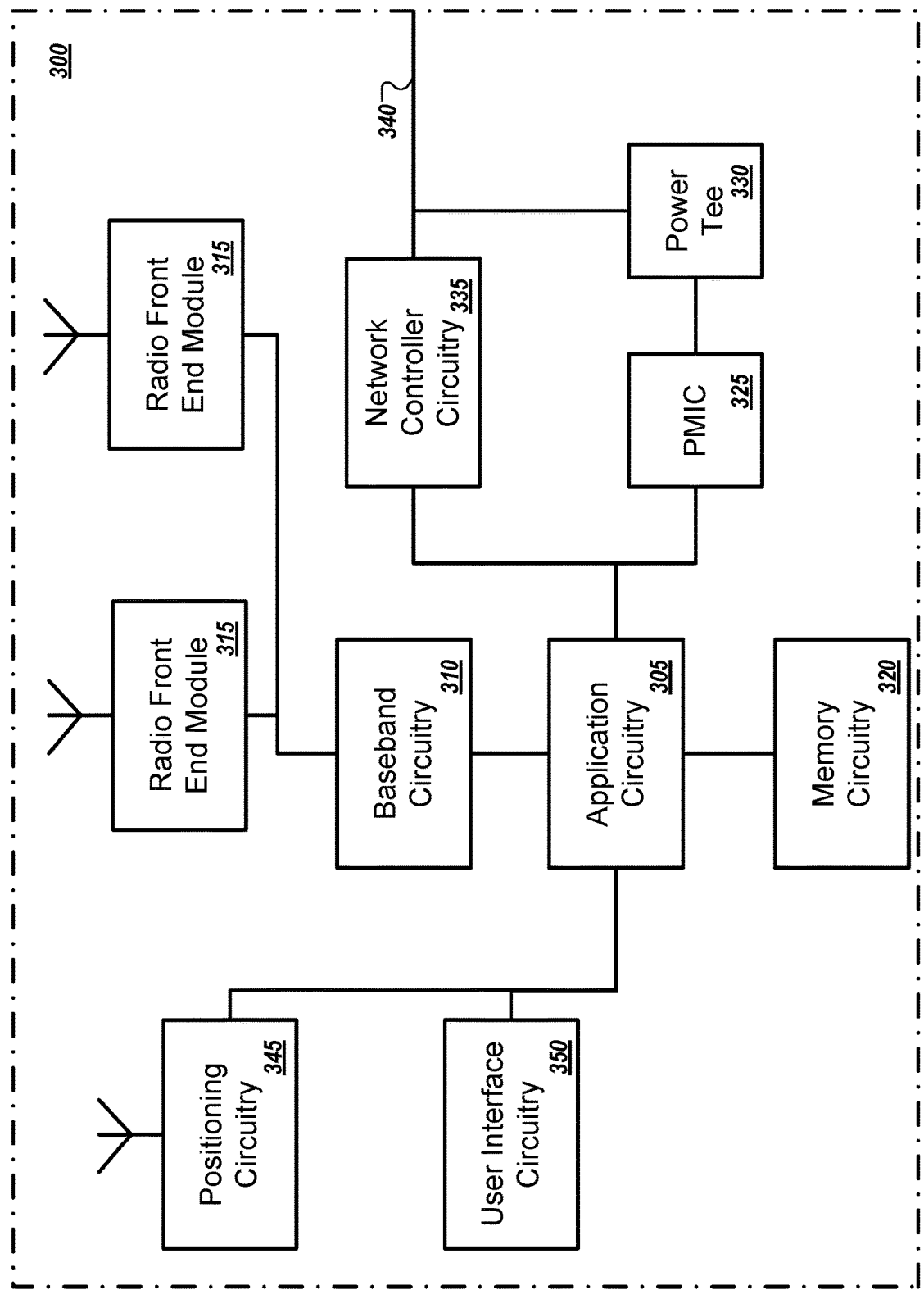
FIG. 3 illustrates an example of infrastructure equipment in accordance with various embodiments.

FIG. 3 illustrates an example of infrastructure equipment 300 in accordance with various embodiments. The infrastructure equipment 300 (or "system 300") may be implemented as a base station, radio head, RAN node, application server(s), and/or any other element/device discussed herein. In other examples, the system 300 could be implemented in or by a UE.

The system 300 includes application circuitry 305, baseband circuitry 310, one or more radio front end modules (RFEMs) 315, memory circuitry 320, power management integrated circuitry (PMIC) 325, power tee circuitry 330, network controller circuitry 335, network interface connector 340, satellite positioning circuitry 345, and user interface 350. In some embodiments, the device 300 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 305 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 305 may be coupled with or may include memory/storage elements and may be configured to execute instructions stored in the memory/storage to enable various applications or operating systems to run on the system 300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 305 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 305 may comprise, or may be, a special-purpose processor/controller to operate according to the various embodiments herein. As examples, the processor(s) of application circuitry 305 may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. Such as the ARM Cortex-A family of processors and the ThunderX2® provided by Cayium™, Inc.; a MIPS-based design from MIPS Technologies, Inc. Such as MIPS Warrior P-class processors; and/or the like. In some embodiments, the system 300 may not utilize application circuitry 305, and instead may include a special-purpose processor/controller to process IP data received from an EPC or 5GC, for example.

In some implementations, the application circuitry 305 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 305 may comprise logic blocks or logic fabric, and other interconnected resources that may be programmed to perform various functions, such as the procedures, methods, functions, etc. Of the various embodiments discussed herein. In such embodiments, the circuitry of application circuitry 305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. In look-up-tables (LUTs) and the like.

The baseband circuitry 310 may be implemented, for example, as a solder-down substrate including one or more integrated circuits, a single packaged integrated circuit soldered to a main circuit board or a multi-chip module containing two or more integrated circuits.

User interface circuitry 350 may include one or more user interfaces designed to enable user interaction with the system 300 or peripheral component interfaces designed to enable peripheral component interaction with the system 300. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 315 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 315, which incorporates both mmWave antennas and sub-mmWave.

The memory circuitry 320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 320 may be implemented as one or more of solder down packaged integrated circuits, socketed memory modules and plug-in memory cards.

The PMIC 325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 300 using a single cable.

The network controller circuitry 335 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 300 via network interface connector 340 using a physical connection, which may be electrical (commonly referred to as a "copper interconnect"), optical, or wireless. The network controller circuitry 335 may include one or more dedicated processors and/or FPGAs to communicate using one or more of the aforementioned protocols. In some implementations, the network controller circuitry 335 may include multiple controllers to provide connectivity to other networks using the same or different protocols.

The positioning circuitry 345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 345 may include a Micro-Technology for Positioning, Navigation, and Timing (Micro-PNT) IC that uses a master timing clock to perform position tracking/estimation without GNSS assistance. The positioning circuitry 345 may also be part of, or interact with, the baseband circuitry 310 and/or RFEMs 315 to communicate with the nodes and components of the positioning network. The positioning circuitry 345 may also provide position data and/or time data to the application circuitry 305, which may use the data to synchronize operations with various infrastructure (e.g., RAN nodes, etc.), or the like.

The components shown by FIG. 3 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A device comprising:
    an integrated circuit for a user equipment that comprises a memory and a non-transitory computer storage medium encoded with instructions that, when executed by the integrated circuit, cause the integrated circuit to perform operations comprising:
        storing first data for a set of codebooks for the user equipment in the memory;
        receiving, from the user equipment, a request for codebook data that includes a reception beam measurement; and
        in response to receiving the request for codebook data:
            determining second data for the set of codebooks for the reception beam measurement of the user equipment using the first data and the reception beam measurement; and
            sending, over a bus, the second data for the set of codebooks for the reception beam measurement of the user equipment to an antenna module separate from the integrated circuit.

2. The device of claim 1, wherein the integrated circuit comprises a baseband processor.

3. The device of claim 1, wherein the integrated circuit comprises an intermediate frequency integrated circuit.

4. The device of claim 1, wherein the operations comprise storing, in the memory and as the first data, at least a portion of the set of codebooks.

5. The device of claim 1, wherein the operations comprise storing, in the memory and as the first data, electronic field data for the user equipment.

6. The device of claim 1, wherein determining the second data comprises generating, using electronic field data for the user equipment, a phase shifter and a gain as the second data.

7. The device of claim 6, wherein determining the second data comprises generating, using at least in part the electronic field data and the reception beam measurement, a beam codebook entry as the second data.

8. The device of claim 7, wherein:
the beam codebook entry indicates a phase shifter, a gain, or both, for the antenna module; and
sending the second data causes the antenna module to use the phase shifter, the gain, or both, to communicate with a base station.

9. The device of claim 1, comprising:
the bus; and
the antenna module.

10. The device of claim 1, wherein the device is the user equipment that comprises the integrated circuit, the bus, and the antenna module.

11. The device of claim 10, comprising:
a second bus that connects the integrated circuit and the antenna module, the operations comprising:
transmitting, over the second bus, at least one of a reception beam measurement, an automatic gain control, or an antenna module setting update.

12. The device of claim 11, wherein transmitting the reception beam measurement comprises receiving, over the second bus and from the antenna module, the reception beam measurement.

13. The device of claim 11, wherein transmitting the antenna module setting update comprises providing, over the second bus and to the antenna module, the antenna module setting update.

14. The device of claim 11, wherein the second bus comprises a separate hardware bus from the bus.

15. The device of claim 11, wherein:
the bus comprises a software bus implemented on the second bus; and
the operations comprise blanking, on the second bus, traffic to create a gap during which the integrated circuit sends the second data on the second bus.

16. The device of claim 1, the operations comprising:
after sending the second data over the bus, receiving, from the antenna module, a reception beam measurement;
determining, using the reception beam measurement and the first data for the set of codebooks, updated second data for the set of codebooks; and
sending, over the bus, the updated second data for the set of codebooks to the antenna module to cause the antenna module to use the updated second data for transmissions with a base station.

17. A computer-implemented method comprising:
storing first data for a set of codebooks for a user equipment in a memory included in an integrated circuit for the user equipment;
receiving, from the user equipment, a request for codebook data that includes a reception beam measurement; and
in response to receiving the request for codebook data:
determining second data for the set of codebooks for the reception beam measurement of the user equipment using the first data and the reception beam measurement; and
sending, over a bus, the second data for the set of codebooks for the reception beam measurement of the user equipment to an antenna module separate from the integrated circuit.

18. The method of claim 17, comprising storing, in the memory and as the first data, at least a portion of the set of codebooks.

19. The method of claim 17, comprising storing, in the memory and as the first data, electronic field data for the user equipment.

20. The method of claim 19, wherein determining the second data comprises generating, using the electronic field data, a phase shifter and a gain as the second data.

* * * * *